United States Patent [19]

Sabon

[11] 4,191,859
[45] Mar. 4, 1980

[54] LOOP, DIAL PULSE AND RING TRIP DETECTION CIRCUIT WITH CAPACITIVE SHUNT NETWORK

[75] Inventor: Robert J. Sabon, Chicago, Ill.

[73] Assignee: GTE Automatic Electric Laboratories Incorporated, Northlake, Ill.

[21] Appl. No.: 956,547

[22] Filed: Nov. 1, 1978

[51] Int. Cl.² .................... H04B 3/46; H04M 3/02
[52] U.S. Cl. ...................... 179/18 FA; 179/18 HB; 179/84 A
[58] Field of Search ............. 179/18 F, 18 FA, 81 R, 179/81 A, 84 R, 84 A, 18 HB

[56] References Cited

U.S. PATENT DOCUMENTS 4,104,488   8/1978   Weir et al. .................... 179/18 FA Primary Examiner—Thomas A. Robinson
Attorney, Agent, or Firm—Robert J. Black; Gregory G. Hendricks

[57] ABSTRACT

A circuit which detects the presence and absence of a telephone subscriber loop, before and after ringing current is applied to the loop. Coils functioning as magnetic field generating devices and a Hall effect device are used to perform the detection function. Inclusion of a capacitive shunt network limits the responsiveness of the Hall effect device during ringing, permitting use of the device on lines to which multiple ringers are connected.

7 Claims, 1 Drawing Figure

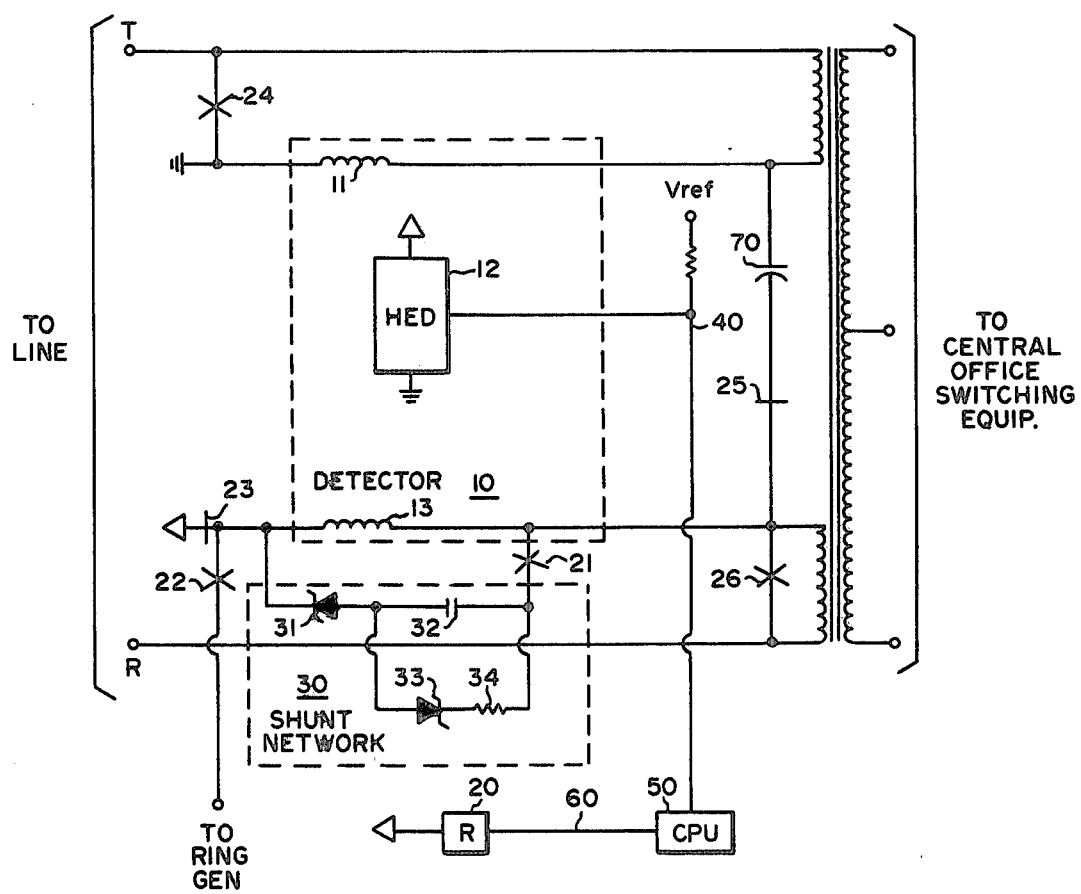

LOOP, DIAL PULSE AND RING TRIP DETECTION CIRCUIT WITH CAPACITIVE SHUNT NETWORK

REFERENCE TO RELATED APPLICATION

The present invention constitutes an improvement over the one described and claimed in applicant's co-pending application Ser. No. 865,761, filed Dec. 29, 1977 and assigned to the same assignee.

BACKGROUND OF THE INVENTION (1) Field of the Invention

The present invention relates to telephone subscriber line apparatus and more particularly to a circuit for determining the on-hook and off-hook status of a telephone subscriber loop.

(2) Description of the Prior Art

In order to provide connection of the switching network to a subscriber station, the central office must be able to detect when the subscriber lifts his handset to the off-hook position to initiate a call, or to answer a call when the central office rings his phone. Once the off-hook condition has been established the central office must also be able to detect the on-hook condition whether caused by placement of the handset in the on-hook position or a series of on-hook and off-hook dial pulses caused by operation of the dial or other calling device.

This problem has traditionally been solved by insertion of a relay in series in the loop which operates when the subscriber completes the loop by lifting his handset. A contemporary approach has been to use solid state devices such as optically-coupled transistors as disclosed in U.S. Pat. No. 3,829,619 issued Aug. 13, 1974, to S. W. Close, et al. Another recent solution has been to use operational amplifiers as disclosed in U.S. Pat. No. 3,941,939 issued Mar. 7, 1976, to P. L. Holmes, et al and U.S. Pat. No. 3,914,556 issued Oct. 21, 1975, to F. W. Frazee.

With further advances in technology, Hall effect devices are now employed in circuits for detection of loop current as disclosed in U.S. Pat. No. 4,020,294 issued Apr. 26, 1977, to R. Kitajewski, et al. In U.S. Pat. No. 4,022,980 also issued to R. Kitajewski, et al, on May 10, 1977, a Hall effect device was disclosed in a ring trip detection circuit.

These solutions to the loop dial pulse and ring trip detection problem have traditionally been accomplished through the use of two distinct circuits. Separation was required between the loop/dial pulse circuit and the ring trip circuit because of the differences in sensitivities required for determining loop status and ring trip.

A combination ring trip and dial pulse detection circuit was disclosed in U.S. Pat. No. 3,838,223 issued Sept. 24, 1974, to D. Q. Lee, et al. This circuit required the use of an optical-coupler, a plurality of logic gates, a delay circuit and a pole change circuit.

The applicants co-pending U.S. patent application, "Loop, Dial Pulse and Ring Trip Detection Circuit", Ser. No. 865,761, filed on Dec. 29, 1977 discloses a novel use of a combined Hall effect device and adjustable resistance shunt. However, the shunt arrangement shown required adjustment for varying loads and limited the total ringer load that could be connected to the subscribers telephone line.

Accordingly, it is the object of this invention to provide a circuit which can detect both loop/dial pulse and ring trip conditions and use a minimum member of components, to operate without the need for separation of the two detection functions by overcoming the problem of different sensitivities for loop status detection and ring trip detection, to operate without requiring adjustment for different load conditions and operable over a wide spectrum of different load conditions.

SUMMARY OF THE INVENTION

The present invention is a circuit which provides for loop, dial pulse and ring trip detection and can operate over a wide range of loop/dial pulse and ring trip sensitivities without adjustment. This circuit is part of the line equipment of a telephone central office and monitors the loop/dial pulse and ring trip status of the telephone subscriber station apparatus.

This circuit consists of a pair of coils connected in series in the subscriber loop, with one coil inserted in the tip lead and the other in the ring lead. A Hall effect device is mounted in the magnetic field generated by these coils and provides electrical outputs corresponding to the presence or absence of magnetic flux. A zener diode is connected in series with a capacitor, both of which are mounted in parallel with the ring lead coil and are electrically connected in parallel with this coil when the central office operates the ringing relay to apply ringing current to the subscriber loop. A second zener diode is connected in series with a resistor, both of which are mounted in parallel with the capacitor to protect the capacitor from high voltages.

When the telephone subscribers hookswitch is operated, the subscriber loop is established to the Central Office and current flows from battery to ground through the loop and therefore through the two coils in the tip and ring leads of the loop. This current flow in the pair of coils produces a magnetic flux which is detected by a Hall effect device mounted proximal to the coils, which sends a corresponding electrical signal to the Central Processing Unit.

When both the subscribers hookswitch and the calling device are operated concurrently or when neither are operated, the subscriber loop is not established, so there is no current flow through the loop. Consequently, the two coils do not produce a magnetic flux and the Hall effect device generates a corresponding electrical signal.

If ringing current had been supplied to the loop, a ringing relay would have been operated by a Central Processing Unit at the Central Office and the zener diode, capacitor combination would have been connected in parallel with the ring lead coil. This shunt path would then allow coil 13 and Hall effect device to produce an output indicating ring trip in response to operation of the subscribers hookswitch even though ringing current had been applied to the loop.

DESCRIPTION OF THE DRAWING

The single FIGURE of the accompanying drawing is a schematic diagram of a subscriber loop/dial pulse and ring trip detection circuit in accordance with the present invention.

DESCRIPTION OF THE PREFERRED EMBODIMENT

Referring now to the accompanying drawing, the subscriber loop/dial pulse and ring trip detection circuit of the present invention is shown.

The detector 10 is connected in the subscriber loop at the subscriber line apparatus in the central office, to monitor the subscriber line status. The tip lead of the subscriber loop is terminated with ground and the ring lead of the subscriber loop is terminated with battery. This circuit includes flux generator coil 11 connected in series in the tip lead, flux generator coil 13 connected in series in the ring lead, Hall effect device 12, connected to a source of reference voltage and to ground, and mounted in the magnetic field of flux generators 11 and 13 and an output connection to the Central Processing Unit 50. A zener diode 31 is connected in series with a capacitor 32 which is connected in series with make contact 21 of ringing relay 20, all of which are connected in parallel with flux generator 13. A second zener diode 33 is connected in series with resistor 34, both of which are connected in parallel with capacitor 32.

The magnetic flux generating means is mechanically designed around a bobbin containing a pocket for rigid and precise positioning of the Hall effect device. This design also provides for adjustability of the magnetic flux density through positioning of the central core which functions as the metallic flux return path.

Normally the subscribers hookswitch is in the nonoperated position causing a lack of continuity in the subscriber loop and an absence of current flow from battery to ground through flux generator coils 11 and 13, and therefore coils 11 and 13 do not generate a magnetic flux. Hall effect device 12 responds to this absence of magnetic flux by producing a voltage level close to $V_{ref}$ which is detected by the Central Processing Unit 50 on lead 40.

When the subscriber operates his hookswitch, the loop is closed and current flows from battery to ground through flux generator coils 11 and 13, which produce a magnetic flux. Hall effect device 12 responds to this magnetic flux by generating a voltage level close to ground which is then detected by Central Processing Unit 50 on lead 40.

When the subscriber operates his calling device after operating his hookswitch to the "off-hook" position, the calling device breaks the loop circuit continuity resulting in an absence of current flow through coils 11 and 13. Consequently, there is an absence of magnetic flux generated by coils 11 and 13 and Hall effect device 12 responds to this absence of magnetic flux by generating a voltage level close to $V_{ref}$ which is then detected by Central Processing Unit 50 via lead 40.

This detection circuit is operated in the ring trip mode when the Central Processing Unit 50 operates ringing relay 20, in any well-known manner thereby connecting zener diode 31 and capacitor 32 in parallel with flux generator 13 by means of make contact 21. This provides a shunt path for the ringing current from an associated ringing signal generator which was applied to the loop by make contact 22, and allows the flux generator to produce a magnetic flux in response to loop continuity caused by operation of the subscribers hookswitch.

In this mode of operation the ringing generator applies AC ringing voltage superimposed on negative battery to a shunt network 30 and coil 13. Before the subscriber lifts his handset there is no DC path through the subscribers telephone so no DC current flows. However, AC ringing current flows through both coil 13 and shunt network 30 to the subscribers ringer. Zener diode 31 only conducts above its breakdown voltage in the reverse direction and its forward voltage drop in the forward direction. Therefore, AC voltage of amplitudes of less than these two threshold voltages will be applied to coil 13 while voltage amplitudes above these threshold voltages will be shunted around coil 13 by shunt network 30. The flux generated by coil 13 from signals below these thresholds is insufficient to cause Hall effect device 12 to switch. With very light ringer load impedances, zener 31 and capacitor 32 have little effect on the AC current flowing thru flux coil 13. However, with increasing AC load impedances the charge — discharge property of zener 31 and capacitor 32 limit the voltage characteristics of flux coil 13 such that a more constant voltage is generated across flux coil 13 over a larger range of load impedance.

When the subscriber lifts his handset to answer, in addition to the AC, DC current flows through the subscribers telephone and thru coil 13. The flux generated by coil 13 in response to DC current alone under long loop conditions may still be insufficient to cause Hall effect device 13 to switch but the flux generated in response to the DC and the AC signal will cause Hall effect device 13 to switch and generate a voltage level close to ground which is a signal to Central Processing 50 that ring trip has occurred. In essence, both AC and DC current are required to effect trip on long loops while only DC is necessary on short loops in that there is an abundence of DC current available to effect trip. Central Processing Unit 50 then releases ring relay 20 to return the detection circuit to the loop and dial pulse detection mode of operation.

Shunt network 30 allows detector 10 to operate without adjustment over a wide range of loads. Under heavy load conditions, as when a large number of ringers are connected to T and R leads of the line circuit, the resulting high current would cause coil 13 to generate a flux sufficient to switch Hall effect device 12, if the excess current were not shunted from coil 13. Since shunt network 30 is able to shunt such a heavy current load, false ring trip can be prevented for a greater number of ringers connected to one line.

Zener diode 33 and resistor 34 are connected across capacitor 32 to limit the voltage developed across capacitor 32. This allows the use of a capacitor of a lower working voltage than would otherwise be required. This diode and resistor operate only from the time the subscriber goes off-hook, in the ring trip mode, until Central Processing Unit 50 releases ring relay 20, since it is only under those conditions that a high voltage is developed across coil 13.

Ringing relay contact 26 is used to prevent ringing current from appearing on the secondary side of transformer 80 and relay contact 25 is used to prevent shorting of the ringing generator to ground.

The loop/dial pulse and ring trip detection circuit of the present invention monitors the status of the subscribers loop to detect operation of the subscribers hookswitch and dial pulse signalling when the subscriber originates a telephone call. This circuit also detects operation of the subscribers hookswitch to trip the ringing generator when the subscriber is the terminator of a telephone call.

It will be obvious to those skilled in the art that numerous modifications of the present invention can be made without departing from the spirit of the invention which shall be limited only by the scope of the claims appended hereto.

What is claimed is:

1. A telephone subscriber loop, dial pulse and ring trip detection circuit, for use in a telephone switching system including a central processing unit, at least one subscriber station including a ringer, a hookswitch and a calling device, said station connectable through said hookswitch to said detection circuit via a subscriber loop circuit, said switching system further including a ringing generator operated to generate an AC ringing voltage superimposed on DC battery, and a ringing relay connected to said central processing unit, said relay operated in response to said central processing unit to connect said ringing generator to said subscriber loop circuit, said detection circuit comprising:

magnetic flux generating means included in said subscriber loop circuit operated to generate a magnetic flux in response to current flow associated with said ringing voltage through said magnetic flux generating means;

magnetic flux detection means located in magnetic field proximity to said magnetic flux generating means, normally operated in response to an absence of magnetic flux to generate a first output signal, and further operated in response to the presence of said magnetic flux to generate a second output signal; and first threshold switching means and capacitor means series connected across said magnetic flux generating means, said first threshold switching means operated in response to voltage amplitudes associated with said ringing voltage above a predetermined value to conduct current to said capacitor, said capacitor operated to conduct alternating current around said magnetic flux generating means and to block the flow of DC current.

2. A detection circuit as claimed in claim 1, wherein: said magnetic flux generating means comprise at least one coil connected in series in said subscriber loop.

3. A detection circuit as claimed in claim 1, wherein: said magnetic flux detection means comprise a Hall effect device.

4. A detection circuit as claimed in claim 1, wherein: there is further included second threshold switching means connected in series to current limiting means across said capacitor means, said second threshold switching means operated in response to voltage amplitudes across said capacitor means above a predetermined value to shunt excess current from said capacitor means to said current limiting means, whereby the voltage across said capacitor means is limited to the total voltage developed across said second threshold switching means and said current limiting means.

5. A detection circuit as claimed in claim 1, wherein: said first threshold switching means comprise a zener diode.

6. A detection circuit as claimed in claim 4, wherein: said second threshold switching means comprise a zener diode.

7. A detection circuit as claimed in claim 4, wherein: said current limiting means comprise a resistor.

* * * * *